(12) United States Patent
Lin et al.

(10) Patent No.: US 9,689,202 B2
(45) Date of Patent: Jun. 27, 2017

(54) ROLL CONTROL DEVICE FOR A VEHICLE CURTAIN

(71) Applicant: MACAUTO INDUSTRIAL CO., LTD., Tainan (TW)

(72) Inventors: Paul Lin, Tainan (TW); Wei-Ting Chen, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 175 days.

(21) Appl. No.: 14/680,194

(22) Filed: Apr. 7, 2015

(65) Prior Publication Data

US 2015/0308188 A1 Oct. 29, 2015

(30) Foreign Application Priority Data

Apr. 29, 2014 (TW) .............................. 103115388 A

(51) Int. Cl.
| | |
|---|---|
| *F16H 3/74* | (2006.01) |
| *E06B 9/60* | (2006.01) |
| *B65H 75/44* | (2006.01) |
| *B65H 75/48* | (2006.01) |
| *E06B 9/44* | (2006.01) |
| *E06B 9/56* | (2006.01) |

(Continued)

(52) U.S. Cl.
CPC ............... *E06B 9/60* (2013.01); *B60J 1/2033* (2013.01); *B65H 75/4442* (2013.01); *B65H 75/486* (2013.01); *E06B 9/42* (2013.01); *E06B 9/44* (2013.01); *E06B 9/56* (2013.01); *E06B 9/78* (2013.01); *E06B 9/82* (2013.01); *F16H 1/28* (2013.01); *F16H 1/46* (2013.01); *E06B 2009/725* (2013.01); *E06B 2009/807* (2013.01)

(58) Field of Classification Search
CPC ..... E06B 9/60; E06B 9/82; E06B 9/78; E06B 9/42; E06B 9/44; E06B 9/56; E06B 2009/725; E06B 2009/807; F16H 1/46; F16H 1/28; B60J 1/2033; B65H 75/4442; B65H 75/486

See application file for complete search history.

(56) References Cited

U.S. PATENT DOCUMENTS

| 2,946,377 | A | * | 7/1960 | Zoll | .......................... | A62C 2/16 |
| | | | | | | 160/296 |
| 4,513,805 | A | * | 4/1985 | Mase | ........................ | E06B 9/80 |
| | | | | | | 160/299 |

(Continued)

*Primary Examiner* — David J Hlavka
(74) *Attorney, Agent, or Firm* — Rosenberg, Klein & Lee

(57) ABSTRACT

A roll control device for a vehicle curtain has a damper, a speed-reduction device, and a unidirectional transmission device. The speed-reduction device is connected to the damper and has a sleeve, a gear mount, and multiple planet gears. The sleeve is hollow and has multiple inner teeth annularly arranged in the sleeve. The gear mount is mounted in and extends out of the sleeve and is connected to the damper. The planet gears are mounted rotatably on the gear mount and engage with the inner teeth in the sleeve. The unidirectional transmission assembly is connected to the speed-reduction device and has a transmission member and a unidirectional transmission device. The transmission member has a gear segment extending into the gear mount and engaging with the planet gears. The unidirectional transmission device is connected to the transmission member to control the transmission member to rotate in unidirectional.

17 Claims, 16 Drawing Sheets

(51) Int. Cl.
*F16H 1/28* (2006.01)
*E06B 9/42* (2006.01)
*E06B 9/78* (2006.01)
*E06B 9/82* (2006.01)
*B60J 1/20* (2006.01)
*F16H 1/46* (2006.01)
*E06B 9/72* (2006.01)
*E06B 9/80* (2006.01)

(56) References Cited

U.S. PATENT DOCUMENTS

| | | | | |
|---|---|---|---|---|
| 4,681,279 A * | 7/1987 | Nakamura | ............... | E06B 9/68 160/294 |
| 2003/0178276 A1* | 9/2003 | Fraczek | .................... | E06B 9/44 192/3.52 |
| 2006/0068962 A1* | 3/2006 | Allsopp | .................... | E06B 9/42 475/182 |

* cited by examiner

US 9,689,202 B2

ROLL CONTROL DEVICE FOR A VEHICLE CURTAIN

BACKGROUND OF THE INVENTION

1. Field of the Invention

The present invention relates to a vehicle curtain, especially to a roll control device of a vehicle curtain.

2. Description of the Prior Art(s)

A conventional vehicle curtain comprises a hollow receiving housing, a curtain rod rotatably mounted in the receiving housing, a curtain fabric connected to the curtain rod, and a rolling device connected to an end of the curtain rod and having a torsion spring. To prevent the curtain rod from vibrating and generating noise due to the bumps between the components of the conventional vehicle curtain, a damper is usually mounted on an outer side of the receiving housing and connected to one end of the curtain rod.

When the curtain fabric is drawn out of the receiving housing and expanded, the torsion spring of the rolling device is twisted and stores elastic potential energy. When the curtain fabric is retracting, the elastic potential energy of the torsion spring drives the curtain rod to roll backward to wrap the curtain fabric around the curtain rod. During retracting of the curtain fabric, the damper can provide a drag force to the curtain rod to reduce the rotation speed of the curtain rod.

However, the damping effect provided by the damper will reduce because the amount of the damping oil in the damper will decrease after a time of use. In addition, the conventional damper is mounted on an outer side of the receiving housing, so the conventional vehicle curtain has a large volume, takes a large space in the vehicle, and badly influences the space arrangement in the vehicle.

To overcome the shortcomings, the present invention provides a roll control device of a vehicle curtain to mitigate or obviate the aforementioned problems.

SUMMARY OF THE INVENTION

The main objective of the present invention is to provide a roll control device for a vehicle curtain.

The roll control device has a damper, a speed-reduction device, and a unidirectional transmission device. The damper is mounted in a curtain rod of the vehicle curtain. The speed-reduction device is connected to the damper and has a sleeve, a gear mount, and multiple planet gears. The sleeve is hollow and has multiple inner teeth annularly arranged in the sleeve. The gear mount is mounted in and extends out of the sleeve and is connected to the damper. The planet gears are mounted rotatably on the gear mount and engage with the inner teeth in the sleeve. The unidirectional transmission assembly is connected to the speed-reduction device and has a transmission member and a unidirectional transmission device. The transmission member has a gear segment extending into the gear mount and engaging with the planet gears. The unidirectional transmission device is connected to the transmission member to control the transmission member to rotate in unidirectional.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
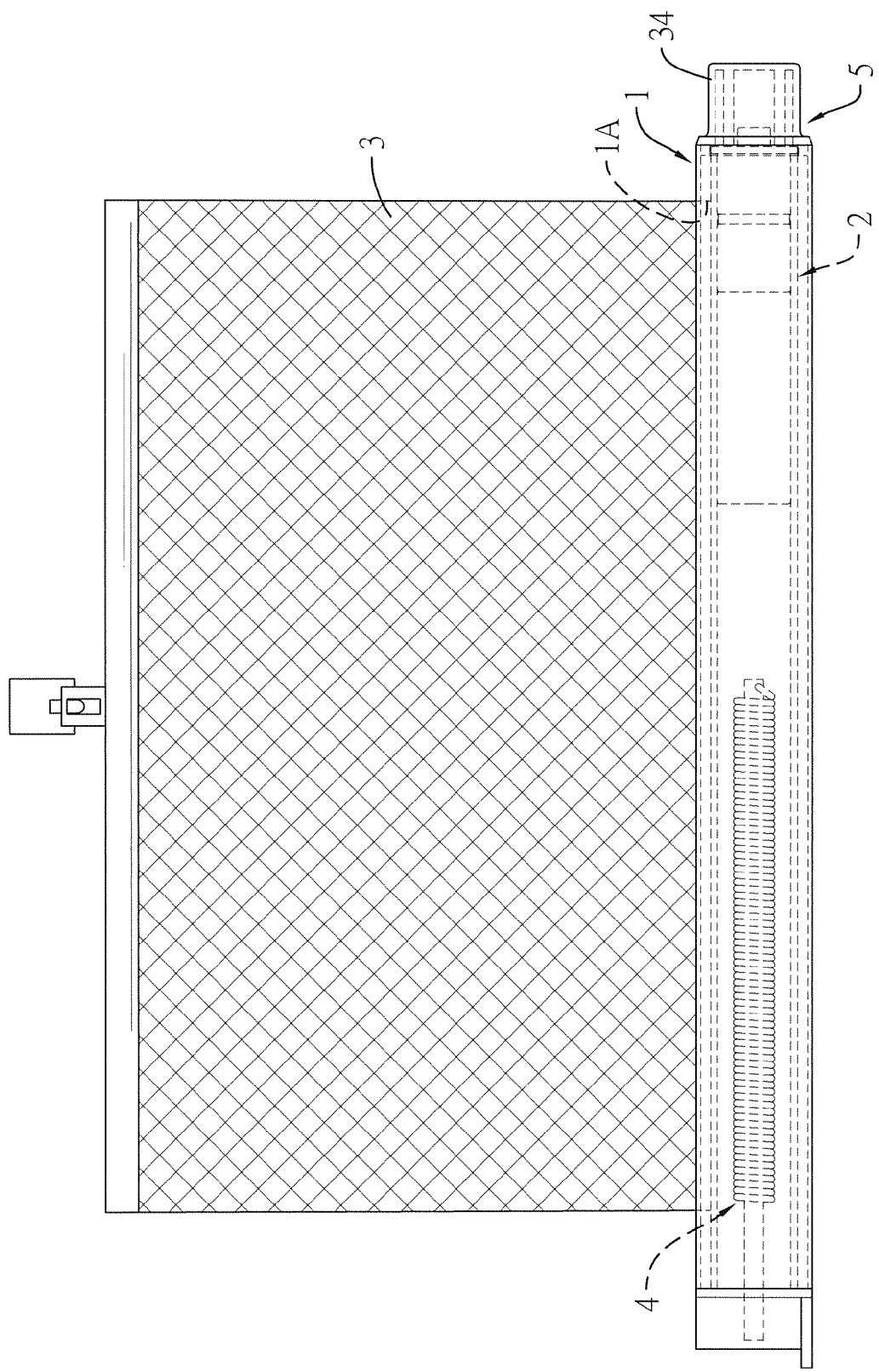
FIG. 1 is a side view of a vehicle curtain with a first embodiment of a roll controlling device in accordance with the present invention.

With reference to FIG. 1, a roll control device 5 in accordance with the present invention is applied to a vehicle curtain. The vehicle curtain may be mounted on a side window, a rear window or a windshield of a vehicle, may be mounted between the front seat and the rear seat or between the rear seat and the trunk. The vehicle curtain substantially comprises a receiving housing 1, a curtain rod 2, a curtain fabric 3 and a rolling device 4. The receiving housing 1 is mounted in the vehicle and has an elongated opening 1A. The curtain rod 2 is rotatably mounted in the receiving housing 1. The curtain fabric 3 has an end connected with curtain rod 2, can be wrapped around the curtain rod 2 and can be expanded or retracted relative to the receiving housing 1 via the elongated opening 1A. The rolling device 4 is mounted in the receiving housing 1, is connected with the curtain rod 2 to drive the curtain rod 2 to rotate and to wrap the curtain fabric 3 around the curtain rod 2 for retracting the curtain fabric 3.

With reference to FIG. 1, the roll controlling device 5 in accordance with the present invention is mounted in the receiving housing 1 and is connected to the curtain rod 2.

Figure 2:
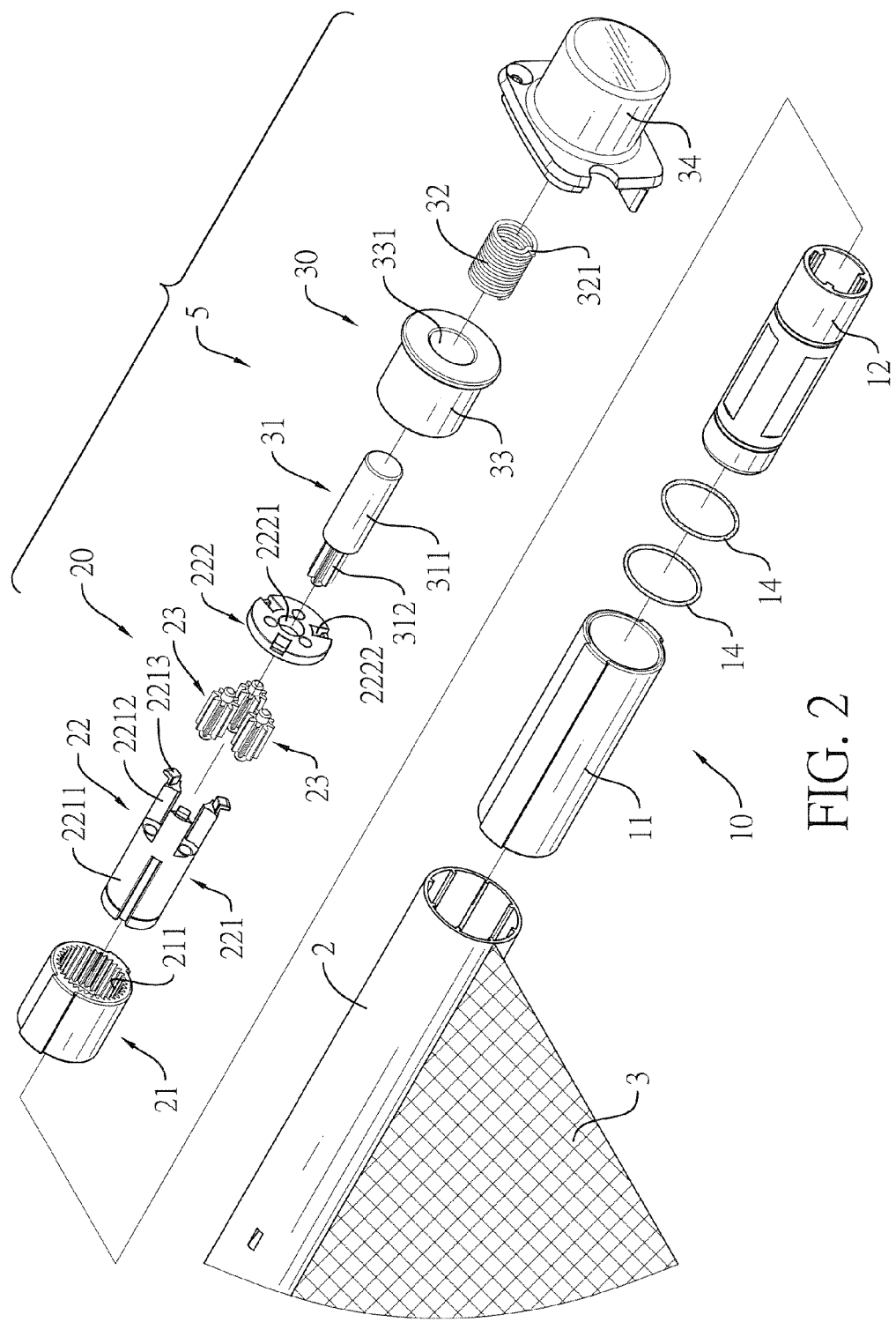
FIG. 2 is an enlarged exploded perspective view of the roll control device in FIG. 1.
Figure 3:
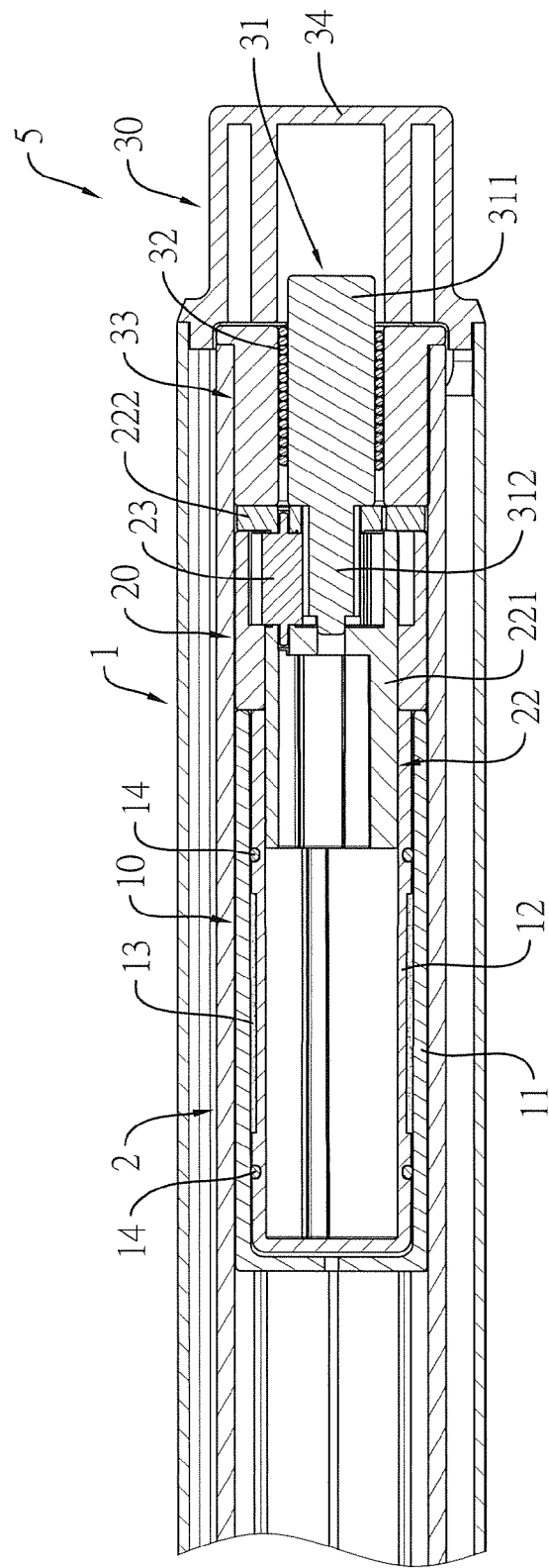
FIG. 3 is an enlarged cross sectional side view of the roll controlling device in FIG. 1.

With reference to FIGS. 2 and 3, in the first embodiment, the roll controlling device 5 comprises a damper 10, a speed-reduction device 20, and a unidirectional transmission assembly 30.

The damper 10 is applied for providing a drag force to the rotation of the curtain rod 2, is mounted in the curtain rod 2 of the vehicle curtain, and comprises an outer tube 11, an inner tube 12, two O-rings 14, and damping oil 13. The inner tube 12 is mounted in the outer tube 11. The O-rings 14 are mounted around the inner tube 12 to form an oil space between the outer tube 11, the inner tube 12, and the O-rings 14. The oil space is filled with the damping oil 13. Preferably, the damping oil 13 may be lubricant oil with a high stickiness. With the high stickiness of the damping oil 13, a drag force will generate while the inner tube 12 is rotated relative to the outer tube 11. In addition, the outer tube 11 is securely mounted in the receiving housing 1 in a protrusion-recess engagement manner.

The speed-reduction device 20 is mounted in the curtain rod 2, is connected to the damper 10, and has a sleeve 21, a gear mount 22 and multiple planet gears 23. The sleeve 21 is mounted securely in the curtain rod 2. Preferably, the sleeve 21 is securely mounted in the curtain rod 2 in a protrusion-recess engagement manner. The sleeve 21 is hollow and has multiple inner teeth 211 annularly arranged in the sleeve 21. The gear mount 22 is mounted in and extends out of the sleeve 21 and is connected to the inner tube 12 of the damper 10. The planet gears 23 are mounted rotatably on the gear mount 22 and engage with the inner teeth 211 in the sleeve 21.

Preferably, the gear mount 22 comprises mount body 221 and a panel 222. The mount body 221 has a body axle 2211, multiple extension arms 2212, and multiple axle holes. The body axle 2211 has a first end connected to the damper 10 and a second end. The extension arms 2212 are formed on and protrude from the second end of the body axle 2211. Each extension arm 2212 has a hook 2213 formed on the free end of the extension arm 2212. The axle holes are defined in the second end of the body axle 2211 respectively between the extension arms 2212. The panel 222 is connected with the mount body 221 and has a central hole 2221, multiple axle holes and multiple connection holes 2222. The central hole 2221 is defined through the center of the panel 222. The axle holes are formed in the panel 222, are arranged around the central hole 2221, and are aligned respectively with the axle holes in the mount body 221. The connection holes 2222 are formed in the panel 222, are arranged around the central hole 2221, and engage respectively with the hooks 2213 on the extension arms 2212 of the mount body 221 to attach the panel 222 securely on the free ends of the extension arms 2212.

Each planet gear 23 has two axle studs respectively formed on and protruding from two ends of the planet gear 23. The axle studs of each planet gear 23 are respectively mounted rotatably in the axle holes in the mount body 221 and the panel 222, such that the planet gears 23 are respectively mounted the extension arms 2212.

The unidirectional transmission assembly 30 is mounted in the curtain rod 2, is connected to the speed-reduction device 20, and has a transmission member 31 and a unidirectional transmission device. The transmission member 31 is rotatably mounted in the gear mount 22 and has a gear segment 312 and an axle 311. The gear segment 312 is formed on an end of the axle 311, extends into the gear mount 22, and engages with the planet gears 23. The axle 311 extends out of the gear mount 22 from the central hole 2221 in the panel 222.

The unidirectional transmission device comprises a torsion spring 32, an outer casing 33, and a fixing cap 34. The torsion spring 32 is mounted around the axle 311 of the transmission member 31 and has a fixing end 321 opposite the gear segment 312. The outer casing 33 is mounted around the axle 311 of the transmission member 31 and has a central hole 331 axially formed through the outer casing 33. The fixing cap 34 is connected securely to an end of the receiving housing 1. The axle 311 of the transmission member 31 extends into the fixing cap 34. The torsions spring 32 and the axle 311 of the transmission member 31 are operationally mounted in the central hole 331 of the outer casing 33. The fixing end 321 of the torsion spring 32 is mounted in and is securely connected with the fixing cap 34. With the arrangement of the torsion spring 32, a unidirectional braking effect is applied to the transmission member 311.

With reference to FIG. 1, when the curtain fabric 3 of the vehicle curtain is expanded from the elongated opening 1A of the receiving housing 1, the curtain rod 2 is rotated with the expansion of the curtain fabric 3. At this time, the rolling device 4 is twisted. With reference to FIGS. 1 and 3, the transmission member 311 will be rotated with the curtain rod 2 in the same direction with the transmission of the speed-reduction device 20. The rotation direction of the transmission member 31 is same as the spiral direction of the torsion spring 32 that is mounted around the axle 311 of the transmission member 31. Thus, the transmission member 311 can rotate freely relative to the torsion spring 32, and the torsion spring 32 is kept from being twisted. Consequently, the rotation of the transmission member 31 is not dragged by the torsion spring 32, and the transmission member 31, the speed-reduction device 20, the curtain rod 2, and the damper 10 are rotated together with each other. Accordingly, the curtain fabric 3 can be expanded smoothly without drag and is hooked on a hook to hold the curtain fabric 3 in a complete expansion position.

Figure 4:
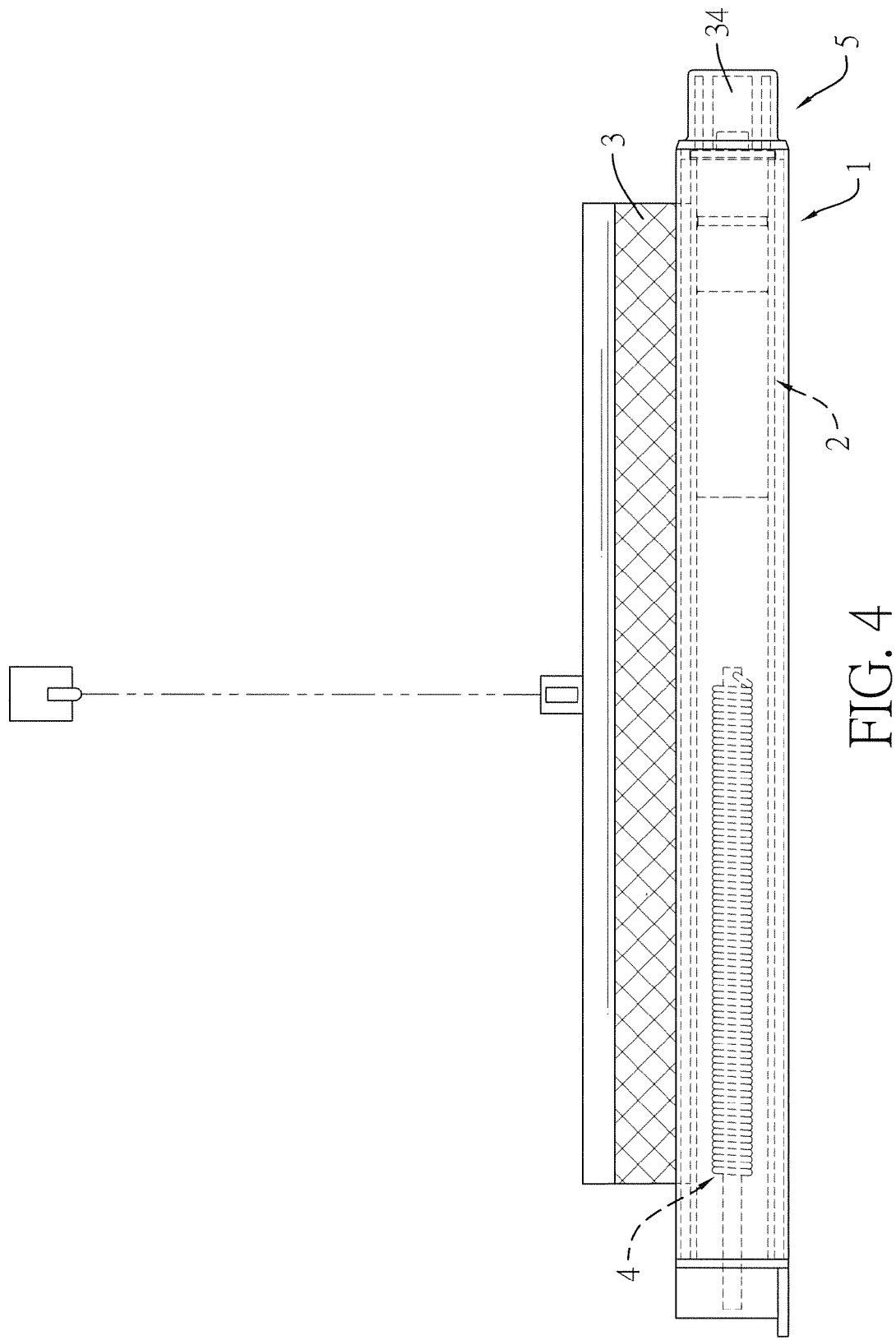
FIG. 4 is an operational side view of the vehicle curtain in FIG. 1.

With reference to FIG. 4, to retract the curtain fabric 3 into the receiving housing 1, the curtain fabric 3 is unhooked from the hook and the curtain rod 2 will be rotated in reverse by the rolling device 4. At this time, with reference to FIGS. 2 to 4, when the transmission member 31 is rotated in reverse, the rotation direction of the transmission member 31 is opposite the spiral direction of the torsion spring 32, the torsion spring 32 will be twisted to apply a drag force to the transmission member 31. In addition, the sleeve 21 of the speed-reduction device 20 is rotated with the curtain rod 2 in the reverse direction, and the planet gears 23 are rotated due to the engagement between the planet gears 23 and inner teeth 211 in the sleeve 21 around the transmission member 31. At the same time, the damper 10 will provide a drag force to the gear mount 22 rotating in the reverse direction, such that the drag force will also be applied to the curtain rod 2. Accordingly, the rotation speed of the curtain rod 2 can be slowed down, and the noise generated during the retraction of the curtain fabric 3 can be effectively reduced.

With the arrangement of the sleeve 21 with inner teeth 211, the planet gears 23, the gear mount 22 and the inner tube 12 of the damper 10, the number of rotation of the damper 10 can be reduced, so that the damper 10 is not easily worn off and the useful life of the damper 10 can be prolonged.

Figure 5:
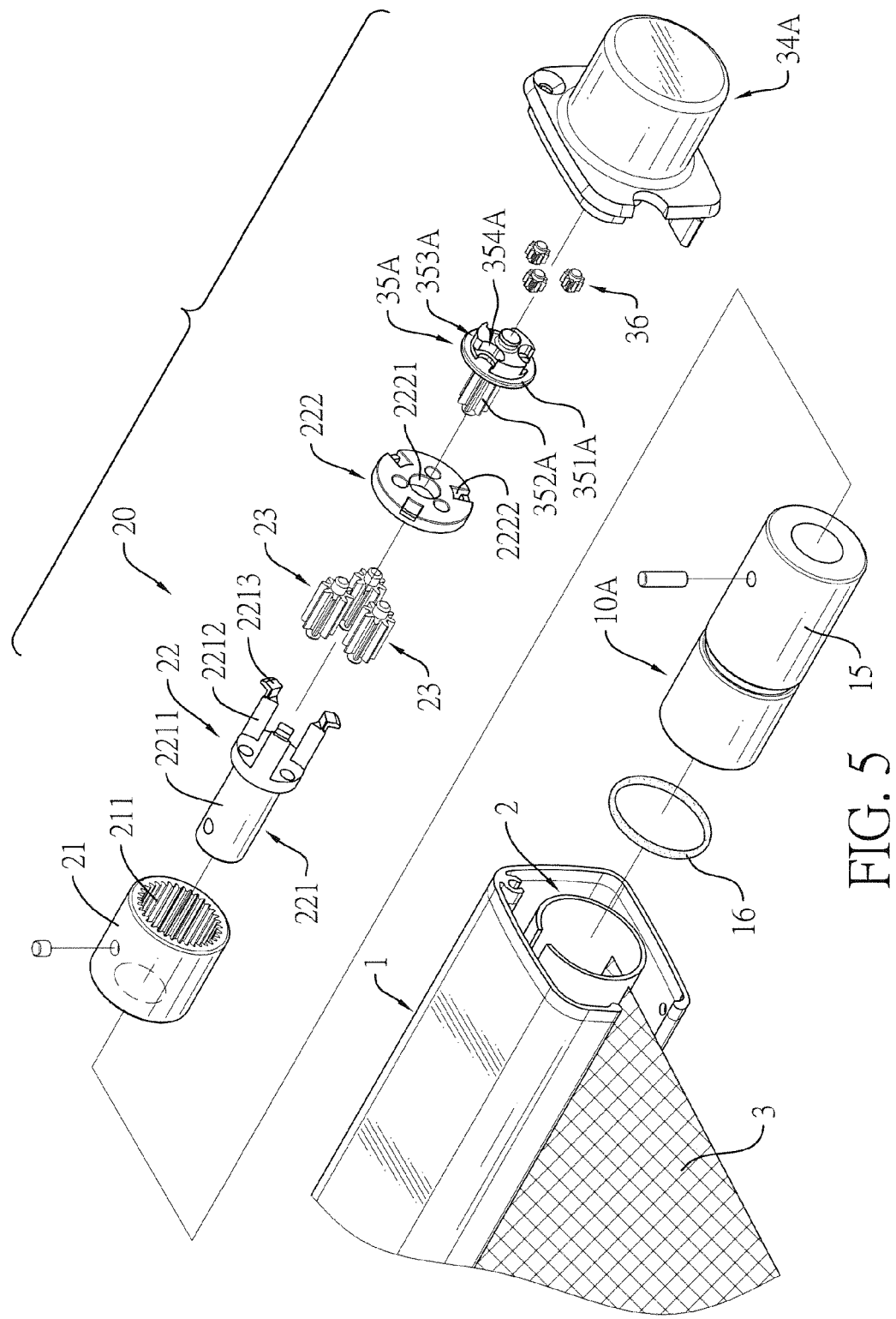
FIG. 5 is an exploded perspective of a second embodiment of a roll controlling device in accordance with the present invention.

With reference to FIG. 5, in the second embodiment, the roll controlling device in accordance with the present invention comprises a damper 10A, a speed-reduction device 20 and a unidirectional transmission assembly 30A.

Figure 6:
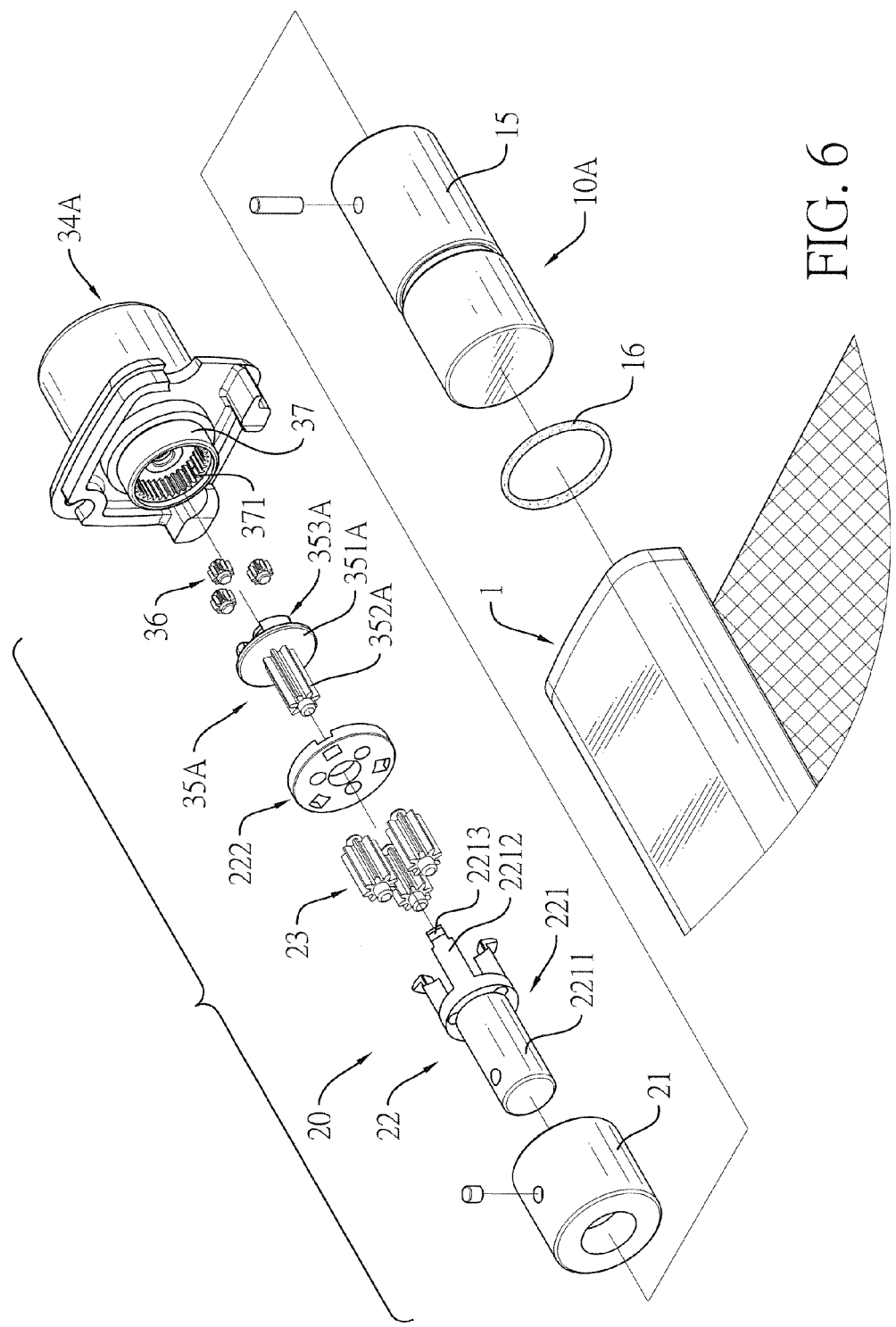
FIG. 6 is another exploded perspective view of the roll controlling device in FIG. 5.
Figure 7:
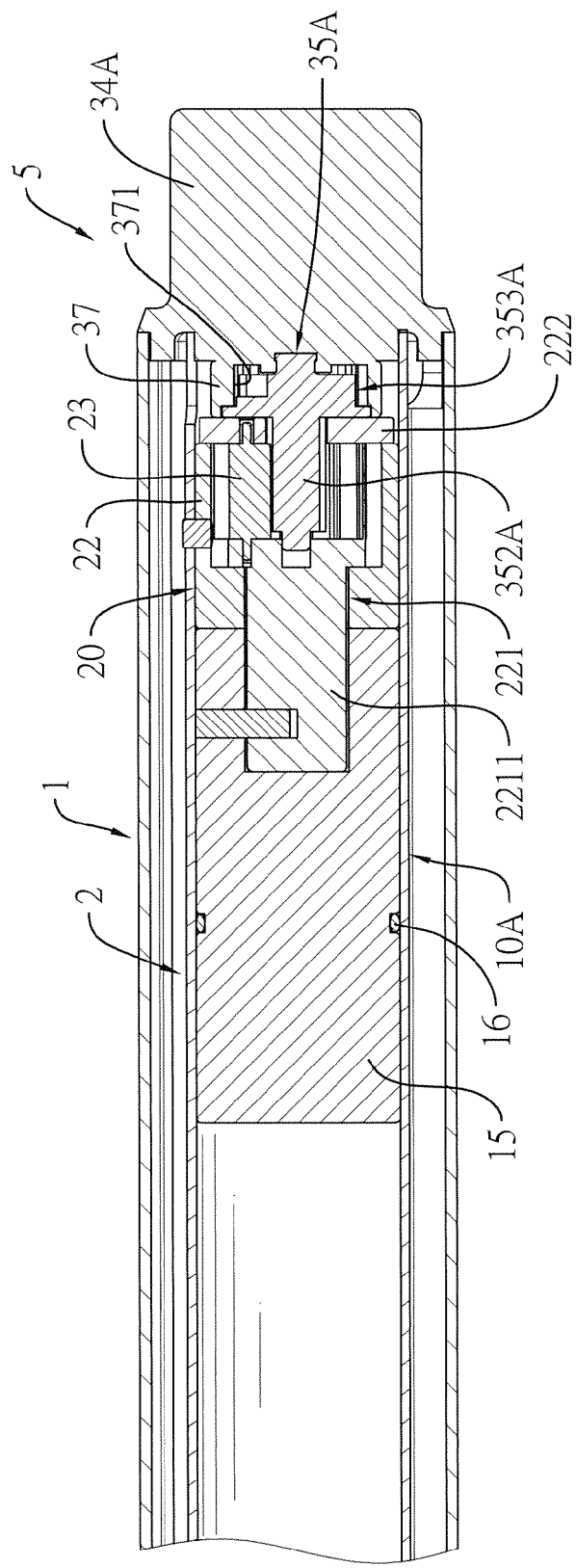
FIG. 7 is a cross sectional side view of the roll controlling device in FIG. 5.

With reference to FIGS. 5 to 7, the damper 10A comprises a damping body 15, a damping oil, and an O-ring.

The damping body 15 is mounted in the curtain rod 2 and has a hole defined in one end of the damping body 15.

The damping oil is disposed around an outer surface of the damping body 15 and may be lubricant oil with a high stickiness. The O-ring is mounted around the damping body 15. With the damping body 15 being mounted in the curtain rod 2, the space between the outer surface of the damping body 15 and the inner body of the curtain rod 2 is filled with the damping oil. With the arrangement of the high sticky damping oil, a drag force is applied to the curtain rod 2 while the curtain rod 2 is rotating.

The speed-reduction device 20 is mounted in the curtain rod 2, is connected to the damper 10A, and comprises a sleeve 21, a gear mount 22, and multiple planet gears 23. The structure and operation of the speed-reduction device 20 in the second embodiment are same as those of the speed-reduction device 20 in the first embodiment, the detail of the speed-reduction device 20 is omitted.

With reference to FIGS. 5 to 7, the unidirectional transmission assembly 30A of the second embodiment comprises a transmission member 35A and a unidirectional transmission device.

Figure 8:
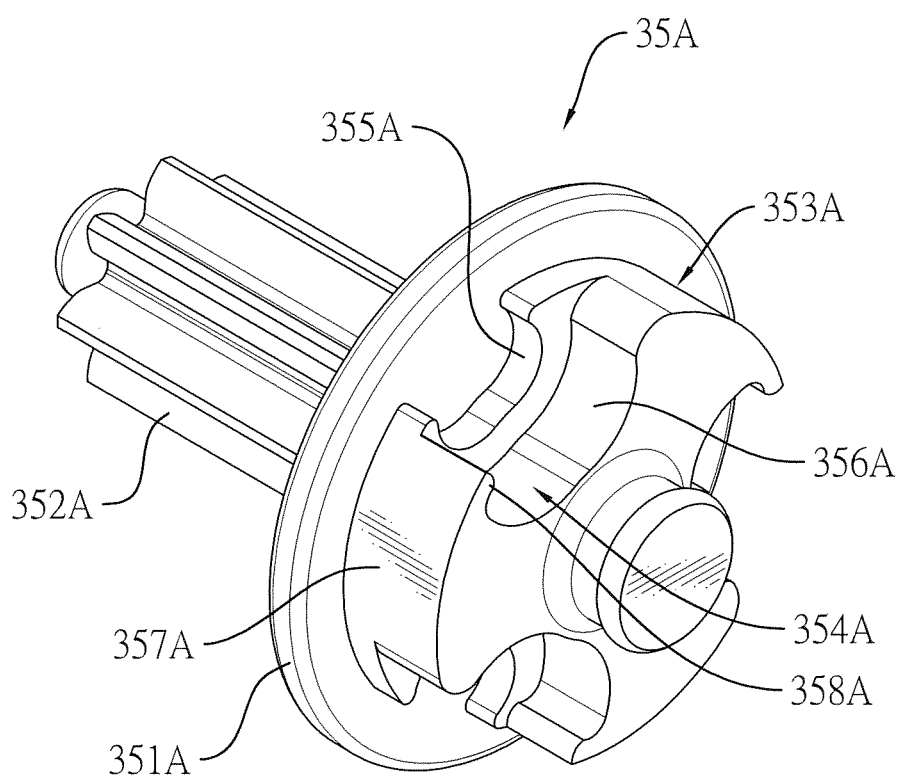
FIG. 8 is an enlarged perspective view of a transmission member with a braking segment of a unidirectional transmission assembly of the vehicle curtain in FIG. 5.

With reference to FIGS. 5, 6, and 8, the transmission member 35A has a connecting segment 351A formed on one end of the gear segment 352A. The gear segment 352A is mounted through the central hole 2221 in the panel 222 and engages with the planet gears 23.

The unidirectional transmission device comprises a braking segment, multiple braking planet gears 36, and a fixing cap 34A. The braking segment is formed on a side of the connecting segment 351A and has multiple receiving recesses 354A and multiple limiting segments 357A. The receiving recesses 354A are formed in a periphery of the braking segment and are arranged around a center of the braking segment at even intervals. Each receiving recess 354A is stepped and comprises a first holding segment 355A and a second holding segment 356A. The first holding segment 355A is adjacent to connecting segment 351A. The second holding segment 356A has an inner diameter larger than that of the first holding segment 355A, and the first holding segment 355A and the second holding segment 356A of each receiving recess 354A respectively have a curved inner surface. The limiting segments 357A are defined respectively between the receiving recesses 354A. Each limiting segment 357A has a curved flange 358A formed on an end of the limiting segment 357A and being adjacent to the second holding segment 356A of a corresponding one of the receiving recesses 354A.

Figure 9:
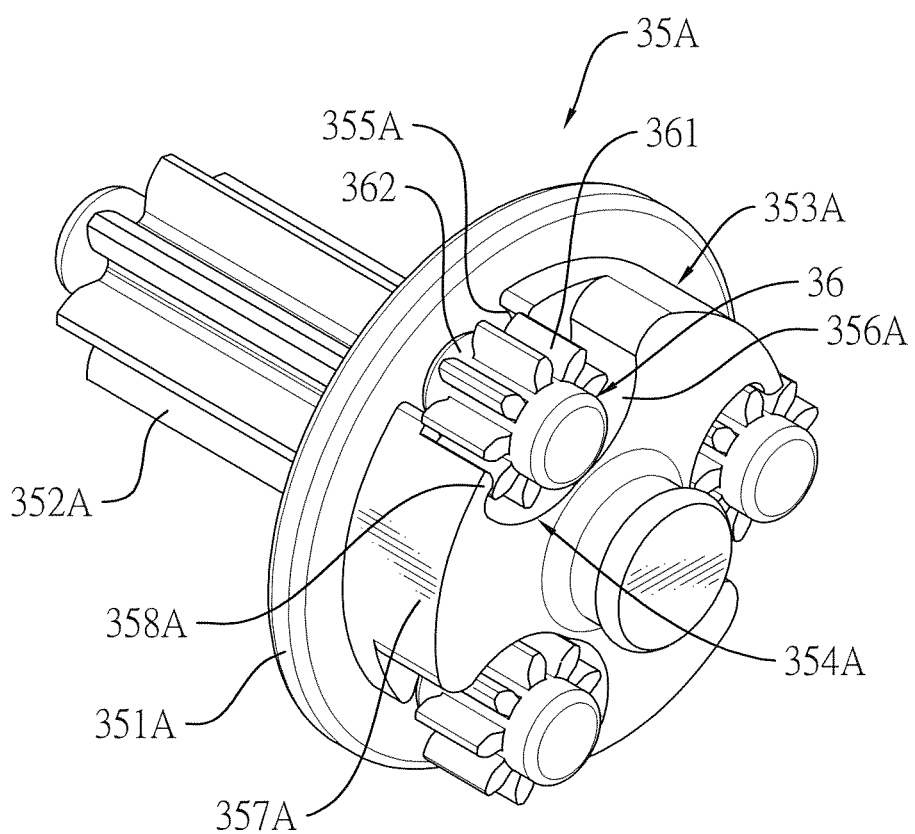
FIG. 9 is an enlarged perspective view of the transmission member with the braking segment and the braking planet gears of the unidirectional transmission device of the vehicle curtain in FIG. 5.

With reference to FIGS. 3, 6, and 9, the braking planet gears 36 are mounted rotatably and slidably in the receiving recesses 354A respectively and are selectively limited by the curved flanges 358A respectively to rotate with the braking segment. Each braking planet gear 36 has a toothed segment 361 mounted in the second holding segment 356A of a corresponding one of the receiving recesses 354A and a gear axle 362 mounted in the first holding segment 355A of the corresponding one of the receiving recesses 354A.

With reference to FIGS. 3, 6, and 7, the fixing cap 34A is connected to an end of the receiving housing 1 and has an annular inner braking sun gear 37 mounted around and engaging with the braking planet gears 36. Preferably, the inner braking sun gear 37 is integrally formed on an end of the fixing cap 34A as a single part. Alternatively, the inner braking sun gear 37 is an individual element relative to the fixing cap 34A and is securely connected with the fixing cap 34A by adhesive, screws, bolts or any possible securing manner.

Figure 10:
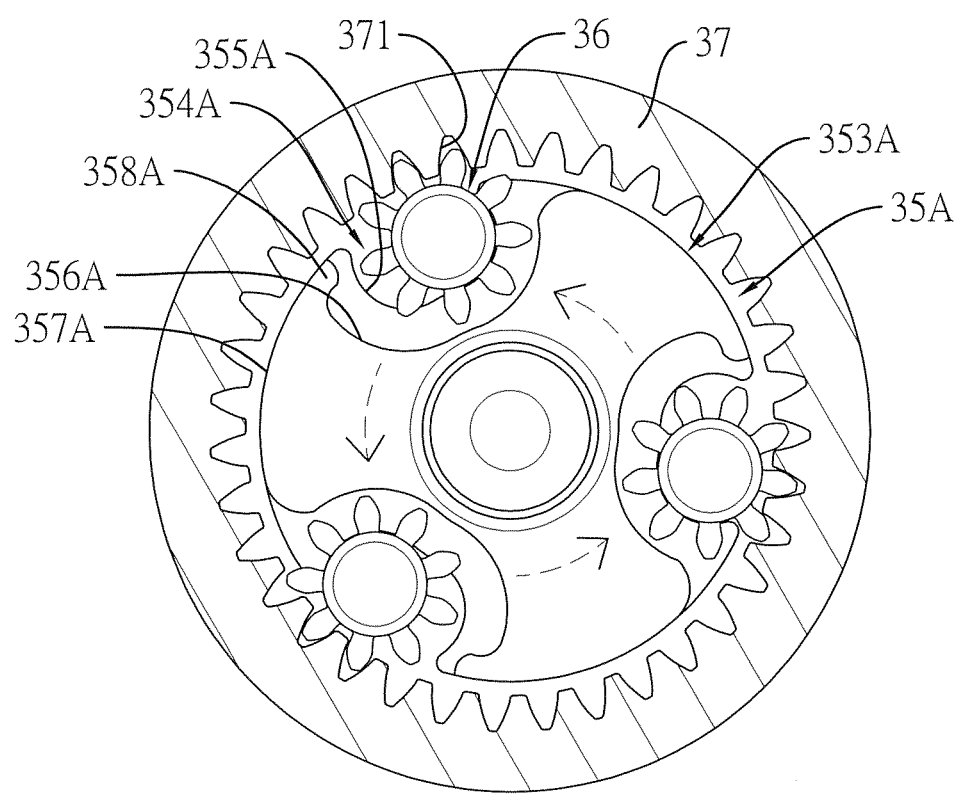
FIG. 10 is an operational end view in partial section of the braking segment and the braking planet gears of the unidirectional transmission device of the vehicle curtain in FIG. 9.

With reference to FIG. 1, when the curtain fabric 3 is expanded from the receiving housing 1, the curtain rod 2 is rotated with the expansion of the curtain fabric 3, and the rolling device 4 is twisted. At this time, with reference to FIGS. 6, 7, and 10, the transmission member 35A is rotated with the curtain rod 2 in the same direction with the transmission of the speed-reduction device 20.

Consequently, the gear axles 362 of the braking planet gears 36 are respectively moved along the curved inner surfaces of the first holding segments 355A to positions where are away from the curved flanges 358A. Thus, the braking planet gears 36 are kept from being limited by the curved flanges 358A of the limiting segments 357A, is free to engage the teeth 371 of the inner braking sun gear 37 and can rotate freely relative to the receiving recesses 354A. Consequently, the rotation of the transmission member 35A is not dragged by the inner braking sun gear 37, and the transmission member 35A, the speed-reduction device 20, the curtain rod 2, and the damper 10A are rotated together with each other. Accordingly, the curtain fabric 3 can be expanded smoothly without drag and is hooked on a hook to hold the curtain fabric 3 in a complete expansion position.

Figure 11:
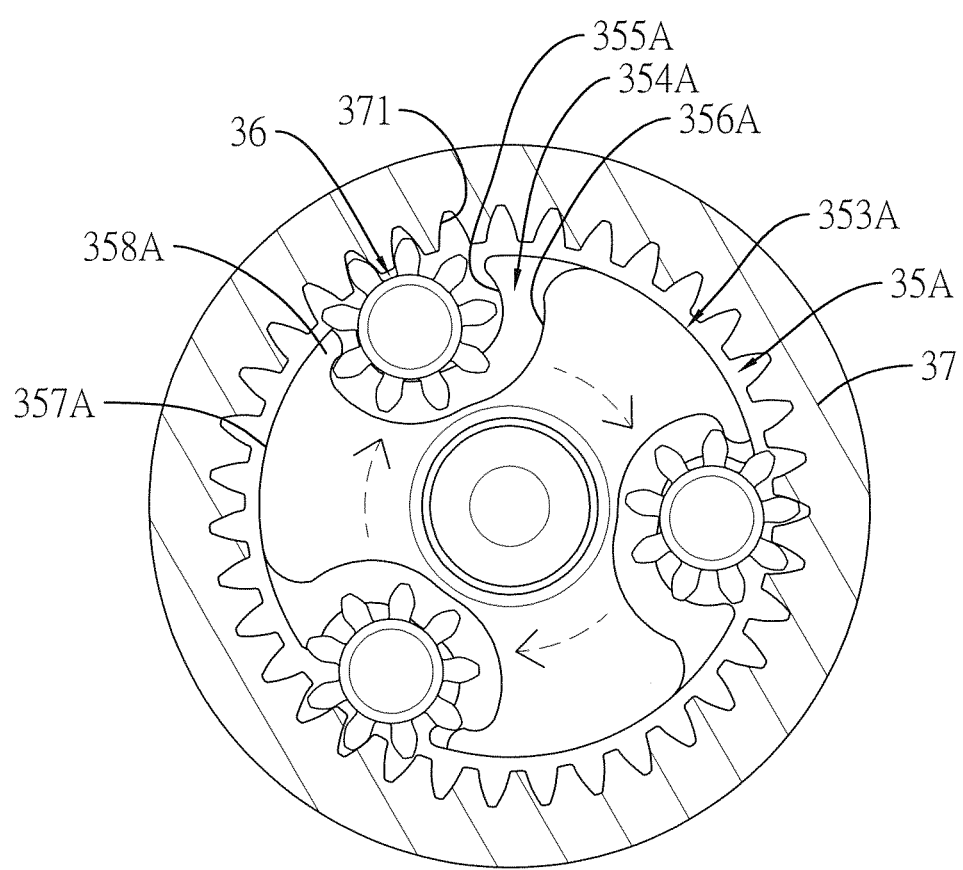
FIG. 11 is another operational end view in partial section of the braking segment and the braking planet gears of the unidirectional transmission device of the vehicle curtain in FIG. 9.

With reference to FIG. 4, when the curtain fabric 3 is retracted into the receiving housing 1, the curtain rod 3 will be rotated in reverse by the rolling device 4. At this time, with reference to FIGS. 6, 7, and 11, the transmission member 35A is rotated in a reverse direction. Consequently, the gear axles 362 of the braking planet gears 36 are respectively moved along the curved inner surfaces of the first holding segments 355A to positions where are adjacent to the curved flanges 358A. Thus, the braking planet gears 36 are limited by the curved flanges 358A of the limiting segments 357A and engage with the teeth 371 of the inner braking sun gear 37. A drag force is applied to the transmission member 35A. In addition, the sleeve 21 of the speed-reduction device 20 is rotated with the curtain rod 2 in the reverse direction, and the planet gears 23 are rotated due to the engagement between the planet gears 23 and inner teeth 211 in the sleeve 21 around the transmission member 35A. At the same time, the damper 10A will provide a drag force to the gear mount 22 rotating in the reverse direction, such that the drag force will also be applied to the curtain rod 2. Accordingly, the rotation speed of the curtain rod 2 can be slowed down, and the noise generated during the retraction of the curtain fabric 3 can be effectively reduced. Furthermore, the number of rotation of the damper 10A can be reduced, and the damper 10A is not easily worn off and the useful life of the damper 10A can be prolonged.

Figure 12:
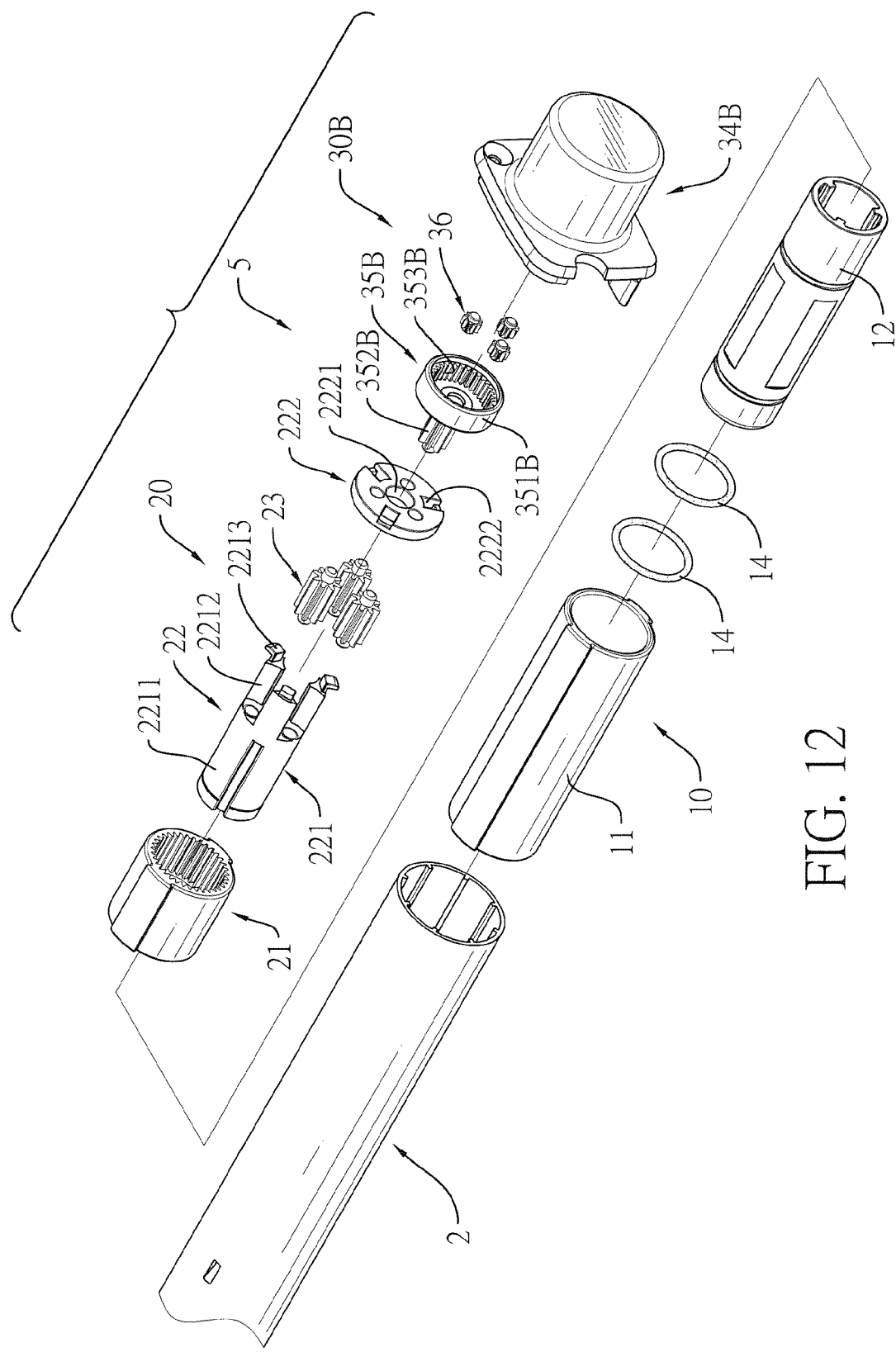
FIG. 12 is an exploded perspective view of a third embodiment of a roll controlling device in accordance with the present invention.
Figure 13:
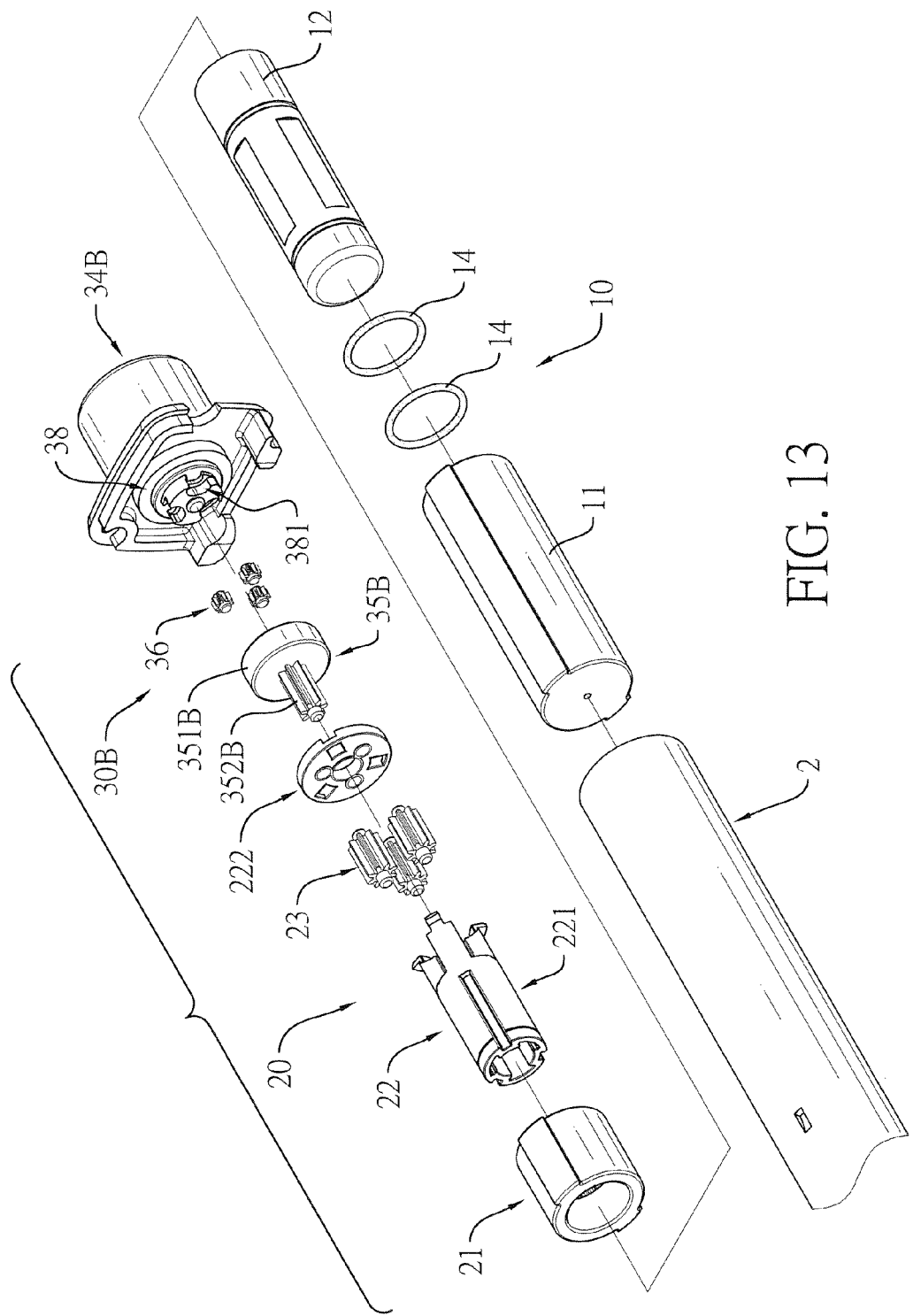
FIG. 13 is another exploded perspective view of the roll controlling device in FIG. 12.
Figure 14:
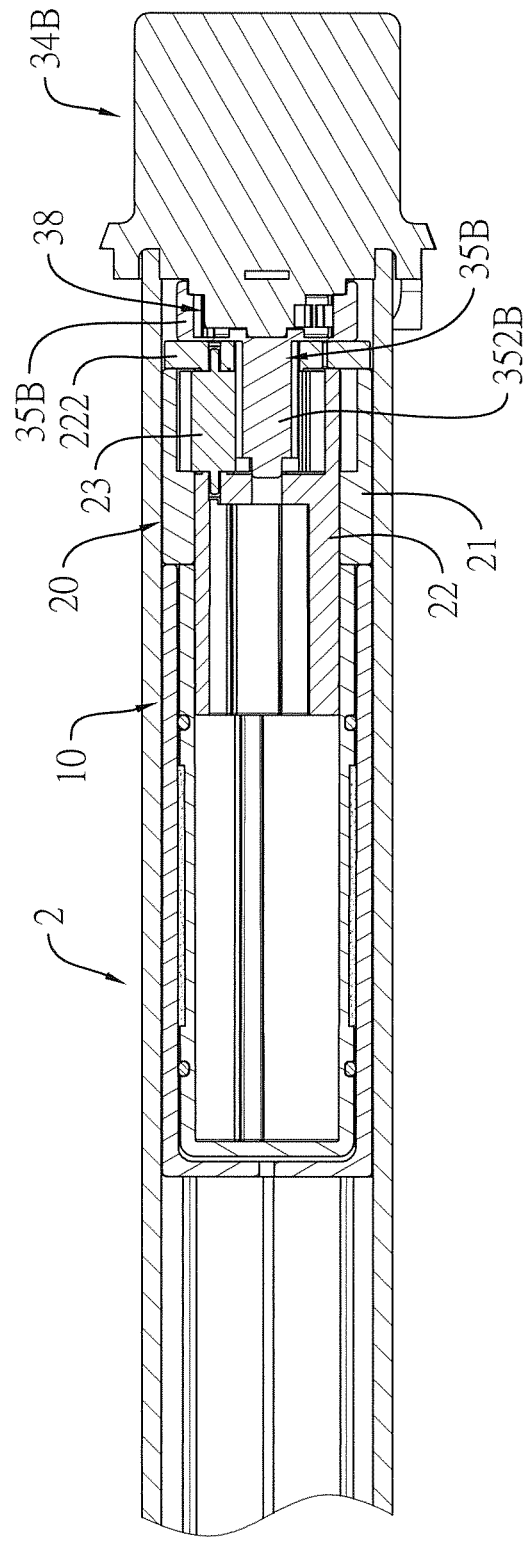
FIG. 14 is a cross sectional side view of the roll controlling device in FIG. 12.
Figure 15:
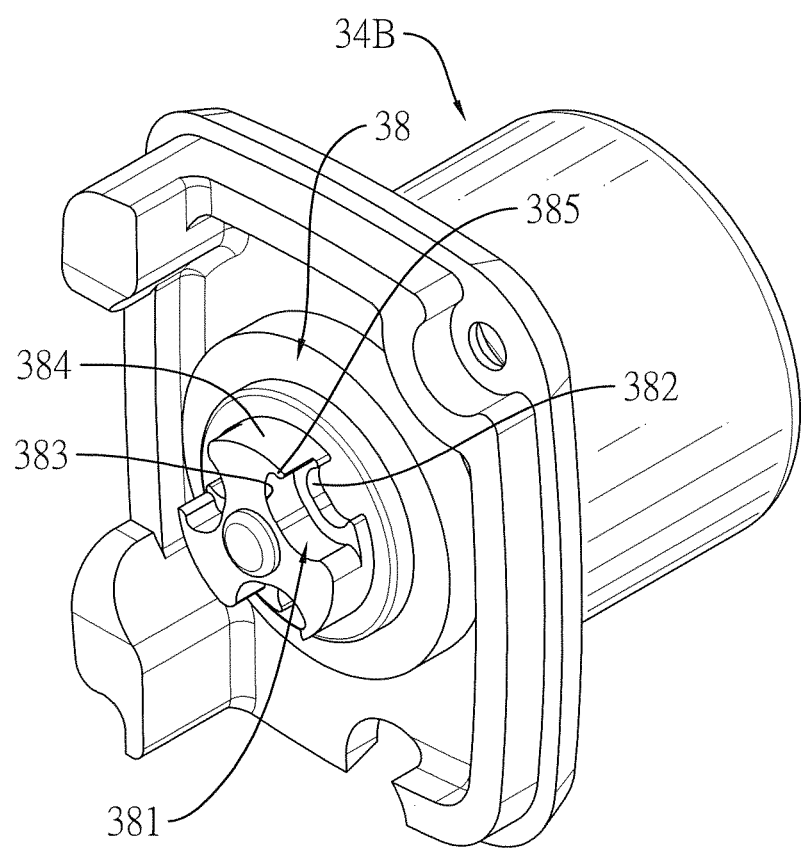
FIG. 15 is an enlarged perspective view of a cap with a braking segment of a unidirectional transmission assembly of the vehicle curtain in FIG. 12.
Figure 16:
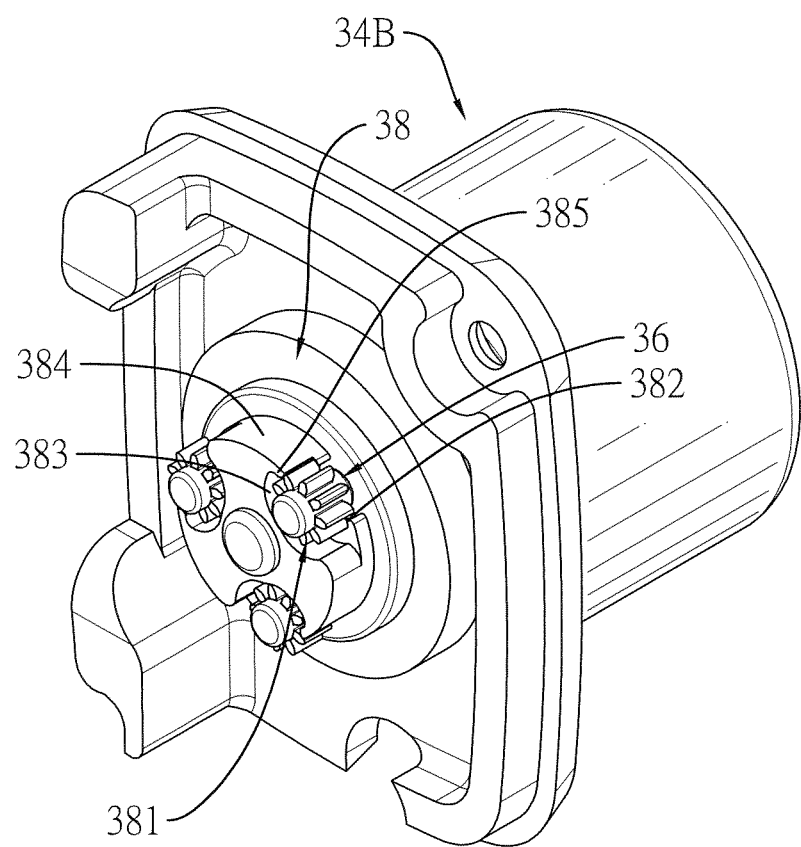
FIG. 16 is an enlarged perspective view of the unidirectional transmission assembly of the vehicle curtain in FIG. 12.

With reference to FIGS. 12 and 13, in the third embodiment, the roll controlling device in accordance with the present invention comprises a damper 10, a speed-reduction device 20 and a unidirectional transmission assembly 30B.

The damper 10 and the speed-reduction device 20 in the third embodiment may be same as those in the first or second embodiment, so the details thereof are omitted.

With reference to FIGS. 12 to 16, the unidirectional transmission assembly 30B comprises a transmission member 35B and a unidirectional transmission device. The unidirectional transmission device comprises an annular inner braking sun gear 351B, a fixing cap 34B, multiple braking planet gears 36 and a braking segment 38. The annular inner braking sun gear 351B is formed on an end of the gear segment 352B of the transmission member 35B. The braking segment 38 is disposed on a side of the fixing cap 34B and extends into the inner braking sun gear 351B. Preferably, the braking segment 38 is integrally formed on the side of the fixing cap 34B as a single part. The braking segment 38 has multiple receiving recesses 381 and multiple limiting segments 384. The receiving recesses 381 are formed in a periphery of the braking segment 38 and are arranged around a center of the braking segment 38 at even intervals. Each receiving recess 381 is stepped and comprises a first holding segment 382 and a second holding segment 383. The first holding segment 382 is adjacent to the fixing cap 34B. The second holding segment 383 has an inner diameter larger than that of the first holding segment 382, and the first holding segment 382 and the second holding segment 383 of each receiving recess 381 respectively have a curved inner surface. The limiting segments 384 are defined respectively between the receiving recesses 381. Each limiting segment 384 has a curved flange 385 formed on an end of the limiting segment 384 and being adjacent to the second holding segment 383 of a corresponding one of the receiving recesses 381.

The braking planet gears 36 engage with the inner braking sun gear 351B, are mounted rotatably and slidably in the receiving recesses 381 respectively, and are selectively limited by the curved flanges 385 respectively to rotate with the braking segment 38. Each braking planet gear 36 has a toothed segment 361 mounted in the second holding segment 383 of a corresponding one of the receiving recesses 381 and a gear axle 362 mounted in the first holding segment 382 of the corresponding one of the receiving recesses 381.

With reference to FIG. 1, when the curtain fabric 3 is expanded from the receiving housing 1, the curtain rod 2 is rotated with the expansion of the curtain fabric 3, and the rolling device 4 is twisted. At this time, with reference to FIGS. 13, 14, and 16, the transmission member 35B is rotated with the curtain rod 2 in the same direction with the transmission of the speed-reduction device 20. Consequently, the inner braking sun gear 351B is rotated with transmission member 35B, and the gear axles 362 of the braking planet gears 36 are respectively moved along the curved inner surfaces of the first holding segments 382 to positions where are away from the curved flanges 385. Thus, the braking planet gears 36 are kept from being limited by the curved flanges 385 of the limiting segments 384, is free to engage the teeth of the inner braking sun gear 351B and can rotate freely relative to the receiving recesses 381. Accordingly, the rotation of the transmission member 35B is not dragged by the braking planet gears 36, and the transmission member 35B, the speed-reduction device 20, the curtain rod 2, and the damper 10 are rotated together with each other. Accordingly, the curtain fabric 3 can be expanded smoothly without drag and is hooked on a hook to hold the curtain fabric 3 in a complete expansion position.

With reference to FIG. 4, when the curtain fabric 3 is retracted into the receiving housing 1, the curtain rod 3 will be rotated in reverse by the rolling device 4. At this time, with reference to FIGS. 13, 14, and 16, the transmission member 35B is rotated in a reverse direction. Consequently, the gear axles 362 of the braking planet gears 36 are respectively moved by the inner braking sun gear 351B along the curved inner surfaces of the first holding segments 382 to positions where are adjacent to the curved flanges 385. Thus, the braking planet gears 36 are limited by the curved flanges 385 of the limiting segments 384 and engage with the inner braking sun gear 351B. A drag force is applied to the transmission member 35B. In addition, the sleeve 21 of the speed-reduction device 20 is rotated with the curtain rod 2 in the reverse direction, and the planet gears 23 are rotated due to the engagement between the planet gears 23 and inner teeth 211 in the sleeve 21 around the transmission member 35B. At the same time, the damper 10 will provide a drag force to the gear mount 22 rotating in the reverse direction, such that the drag force will also be applied to the curtain rod 2. Accordingly, the rotation speed of the curtain rod 2 can be slowed down.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A roll control device for a vehicle curtain comprising:
   a damper for being mounted in a curtain rod of the vehicle curtain;
   a speed-reduction device connected to the damper and having
      a sleeve being hollow and having multiple inner teeth annularly arranged in the sleeve;
      a gear mount mounted in and extending out of the sleeve and connected to the damper; and
      multiple planet gears mounted rotatably on the gear mount and engaging with the inner teeth in the sleeve; and
   a unidirectional transmission assembly connected to the speed-reduction device and having
      a transmission member having a gear segment extending into the gear mount and engaging with the planet gears; and
      a unidirectional transmission device connected to the transmission member to control the transmission member to rotate unidirectionally, wherein
   the gear mount comprises
      a mount body having
         a body axle connected to the damper;
         multiple extension arms formed on and protruding from one end of the body axle, and each extension arm having a hook formed on an end of the extension arm; and
         multiple axle holes defined in the mount body respectively between the extension arms;
      a panel connected with the mount body and having
         a central hole defined through the panel;
         multiple axle holes formed in the panel, arranged around the central hole, and aligned respectively with the axle holes in the mount body; and
         multiple connection holes formed in the panel, arranged around the central hole, and engaging respectively with the hooks on the extension arms of the mount body; and
      each planet gear has two axle studs respectively formed on and protruding from two ends of the planet gear, and the axle studs of each planet gear are respectively mounted rotatably in the axle holes in the mount body and the panel.
2. The roll control device as claimed in claim 1, wherein the damper comprises
   an outer tube
   an inner tube mounted in the outer tube and connected to the mount body of the gear mount of the speed-reduction device; and two O-rings mounted around the inner tube to form an oil space between the outer tube, the inner tube, and the two O-rings, wherein the oil space is filled with damping oil.

3. The roll control device as claimed in claim 2, wherein
the transmission member of the unidirectional transmission assembly further comprises an axle having an end on which the gear segment is formed; and
the unidirectional transmission device comprises
a torsion spring mounted around the axle of the transmission member and having a fixing end opposite the gear segment;
an outer casing mounted around the axle of the transmission member and having a central hole axially formed through the outer casing; and
a fixing cap into which the axle of the transmission member extends and connected securely to the fixing end of the torsion spring; and
the torsion spring and the axle of the transmission member are operationally mounted in the central hole of the outer casing.

4. The roll control device as claimed in claim 2, wherein
the transmission member further has a connecting segment formed on one end of the gear segment;
the unidirectional transmission device comprises
a braking segment formed on a side of the connecting segment and having
multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and
multiple limiting segments defined respectively between the receiving recesses and each limiting segment having a curved flange formed on an end of the limiting segment and being adjacent to the second holding segment of a corresponding one of the receiving recesses;
multiple braking planet gears mounted rotatably and slidably in the receiving recesses respectively and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses;
a fixing cap having an annular inner braking sun gear mounted around and engaging with the braking planet gears.

5. The roll control device as claimed in claim 2, wherein
the unidirectional transmission device comprises
an annular inner braking sun gear formed on an end of the gear segment of the transmission member;
a fixing cap;
a braking segment disposed on a side of the fixing cap, extending into the inner braking sun gear, and having
multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and
multiple limiting segments defined respectively between the receiving recesses and each limiting segment having a curved flange formed on an end of the limiting segment and being adjacent to the second holding segment of a corresponding one of the receiving recesses; and
multiple braking planet gears engaging the inner braking sun gear, mounted rotatably and slidably in the receiving recesses respectively, and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses.

6. The roll control device as claimed in claim 1, wherein
the damper comprises
a damping body having a hole defined in one end of the damping body;
a damping oil disposed around an outer surface of the damping body; and
an O-ring mounted around the damping body; and
the mount body of the gear mount of the speed-reduction device is mounted securely in the hole in the damping body to connect the mount body with the damping body.

7. The roll control device as claimed in claim 6, wherein
the transmission member of the unidirectional transmission assembly further comprises an axle having an end on which the gear segment is formed; and
the unidirectional transmission device comprises
a torsion spring mounted around the axle of the transmission member and having a fixing end opposite the gear segment;
an outer casing mounted around the axle of the transmission member and having a central hole axially formed through the outer casing; and
a fixing cap into which the axle of the transmission member extends and connected securely to the fixing end of the torsion spring; and
the torsion spring and the axle of the transmission member are operationally mounted in the central hole of the outer casing.

8. The roll control device as claimed in claim 6, wherein
the transmission member further has a connecting segment formed on one end of the gear segment;
the unidirectional transmission device comprises
a braking segment formed on a side of the connecting segment and having
multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and
multiple limiting segments defined respectively between the receiving recesses and each limiting segment having a curved flange formed on an end of the limiting segment and being adjacent to the second holding segment of a corresponding one of the receiving recesses;

multiple braking planet gears mounted rotatably and slidably in the receiving recesses respectively and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses;

a fixing cap having an annular inner braking sun gear mounted around and engaging with the braking planet gears.

9. The roll control device as claimed in claim 6, wherein the unidirectional transmission device comprises an annular inner braking sun gear formed on an end of the gear segment of the transmission member;

a fixing cap;

a braking segment disposed on a side of the fixing cap, extending into the inner braking sun gear, and having multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and multiple limiting segments defined respectively between the receiving recesses and each limiting segment having a curved flange formed on an end of the limiting segment and being adjacent to the second holding segment of a corresponding one of the receiving recesses; and multiple braking planet gears engaging the inner braking sun gear, mounted rotatably and slidably in the receiving recesses respectively, and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses.

10. The roll control device as claimed in claim 1, wherein the transmission member of the unidirectional transmission assembly further comprises an axle having an end on which the gear segment is formed; and the unidirectional transmission device comprises a torsion spring mounted around the axle of the transmission member and having a fixing end opposite the gear segment;

an outer casing mounted around the axle of the transmission member and having a central hole axially formed through the outer casing; and a fixing cap into which the axle of the transmission member extends and connected securely to the fixing end of the torsion spring; and the torsion spring and the axle of the transmission member are operationally mounted in the central hole of the outer casing.

11. The roll control device as claimed in claim 1, wherein the transmission member further has a connecting segment formed on one end of the gear segment;

the unidirectional transmission device comprises a braking segment formed on a side of the connecting segment and having multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and multiple limiting segments defined respectively between the receiving recesses and each limiting segment having a curved flange formed on an end of the limiting segment and being adjacent to the second holding segment of a corresponding one of the receiving recesses;

multiple braking planet gears mounted rotatably and slidably in the receiving recesses respectively and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses;

a fixing cap having an annular inner braking sun gear mounted around and engaging with the braking planet gears.

12. The roll control device as claimed in claim 11, wherein the inner braking sun gear is integrally formed on an end of the fixing cap as a single part.

13. The roll control device as claimed in claim 1, wherein the unidirectional transmission device comprises an annular inner braking sun gear formed on an end of the gear segment of the transmission member;

a fixing cap;

a braking segment disposed on a side of the fixing cap, extending into the inner braking sun gear, and having multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and multiple limiting segments defined respectively between the receiving recesses and each limiting segment having a curved flange formed on an end of the limiting segment and being adjacent to the second holding segment of a corresponding one of the receiving recesses; and multiple braking planet gears engaging the inner braking sun gear, mounted rotatably and slidably in the receiving recesses respectively, and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses.

14. The roll control device as claimed in claim 13, wherein the braking segment is integrally formed on the side of the fixing cap as a single part.

15. A roll control device for a vehicle curtain comprising:
a damper for being mounted in a curtain rod of the vehicle curtain;
a speed-reduction device connected to the damper and having
  a sleeve being hollow and having multiple inner teeth annularly arranged in the sleeve;
  a gear mount mounted in and extending out of the sleeve and connected to the damper; and
  multiple planet gears mounted rotatably on the gear mount and engaging with the inner teeth in the sleeve; and
a unidirectional transmission assembly connected to the speed-reduction device and having
  a transmission member having a gear segment extending into the gear mount and engaging with the planet gears; and
  a unidirectional transmission device connected to the transmission member to control the transmission member to rotate unidirectionally, wherein
the transmission member further has a connecting segment formed on one end of the gear segment;
the unidirectional transmission device comprises
  a braking segment formed on a side of the connecting segment and having
    multiple receiving recesses formed in a periphery of the braking segment and arranged around a center of the braking segment at even intervals, each receiving recess being stepped and comprising a first holding segment and a second holding segment, wherein the second holding segment has an inner diameter larger than that of the first holding segment, and the first holding segment and the second holding segment of each receiving recess respectively have a curved inner surface; and
    multiple limiting segments defined respectively between the receiving recesses and each limiting segment having a curved flange formed on an end of the limiting segment and being adjacent to the second holding segment of a corresponding one of the receiving recesses;
  multiple braking planet gears mounted rotatably and slidably in the receiving recesses respectively and selectively limited by the curved flanges respectively to rotate with the braking segment, and each braking planet gear having a toothed segment mounted in the second holding segment of a corresponding one of the receiving recesses and a gear axle mounted in the first holding segment of the corresponding one of the receiving recesses;
  a fixing cap having an annular inner braking sun gear mounted around and engaging with the braking planet gears.

16. The roll control device as claimed in claim 15, wherein the inner braking sun gear is integrally formed on an end of the fixing cap as a single part.

17. A roll control device for a vehicle curtain comprising:
a damper for being mounted in a curtain rod of the vehicle curtain;
a speed-reduction device connected to the damper and having
  a sleeve being hollow and having multiple inner teeth annularly arranged in the sleeve;
  a gear mount mounted in and extending out of the sleeve and connected to the damper; and
  multiple planet gears mounted rotatably on the gear mount and engaging with the inner teeth in the sleeve; and
a unidirectional transmission assembly connected to the speed-reduction device and having
  a transmission member having a gear segment extending into the gear mount and engaging with the planet gears; and
  a unidirectional transmission device connected to the transmission member to control the transmission member to rotate unidirectionally, wherein
the transmission member of the unidirectional transmission assembly further comprises an axle having an end on which the gear segment is formed; and
the unidirectional transmission device comprises
a torsion spring mounted around the axle of the transmission member and having a fixing end opposite the gear segment;
an outer casing mounted around the axle of the transmission member and having a central hole axially formed through the outer casing; and
a fixing cap into which the axle of the transmission member extends and connected securely to the fixing end of the torsion spring; and
the torsion spring and the axle of the transmission member are operationally mounted in the central hole of the outer casing.

* * * * *